United States Patent

[11] 3,602,688

[72] Inventor Craig R. Sibley
 Murray Hill, N.J.
[21] Appl. No. 812,716
[22] Filed Apr. 2, 1969
[45] Patented Aug. 31, 1971
[73] Assignee Air Reduction Company, Incorporated
 New York, N.Y.

[54] VERTICAL ELECTRIC WELDING WITH HEAT ABSORBING WORK LINING
 5 Claims, 4 Drawing Figs.

[52] U.S. Cl. .................................................. 219/137,
 219/73, 219/126
[51] Int. Cl. ...................................................... B23k 9/00
[50] Field of Search ........................................... 219/73,
 126, 137, 76; 29/483, 492, 498

[56] References Cited
 UNITED STATES PATENTS

| | | | |
|---|---|---|---|
| 1,108,592 | 10/1914 | Lincoln .......................... | 219/137 |
| 2,146,901 | 2/1939 | Lane ............................... | 29/483 |
| 2,330,289 | 9/1943 | Keir ................................ | 219/76 |
| 3,118,047 | 1/1964 | Johnson ......................... | 219/76 |
| 2,220,576 | 11/1940 | MacKusick .................... | 219/73 |
| 2,233,455 | 3/1941 | Larson ........................... | 219/73 X |
| 2,416,379 | 2/1947 | Cohn ............................... | 219/137 |
| 2,945,116 | 7/1960 | Mosny' et al. ................. | 219/73 |
| 3,436,520 | 6/1969 | Anders et al. ................. | 219/73 X |

Primary Examiner—J. V. Truhe
Assistant Examiner—George A. Montanye
Attorneys—Larry R. Cassett, Edmund W. Bopp and H. Hume Mathews ABSTRACT: A pair of thick steel plates comprising the work, are spaced edgewise to form a vertical weld gap suitable for known techniques of vertical electric welding. Within the gap, the facing edge of each plate is lined with a metal strip constituting a consumable heat sink for absorbing welding heat. The strips which are generally similar in composition to the work, are of predetermined thickness for absorbing applied welding heat in sufficient amount to prevent massive heat penetration of the work, while insuring complete fusion within the gap of the strips, the adjoining facing edges of the work and the molten weld metal.

FIG. 1
FIG. 2
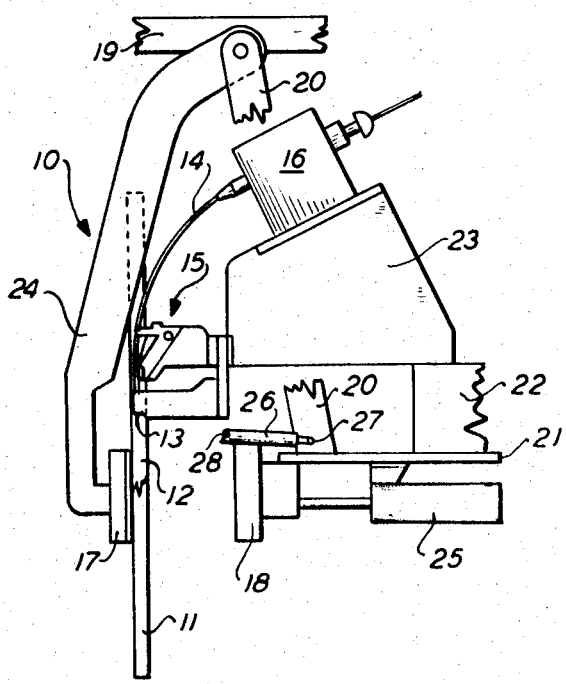
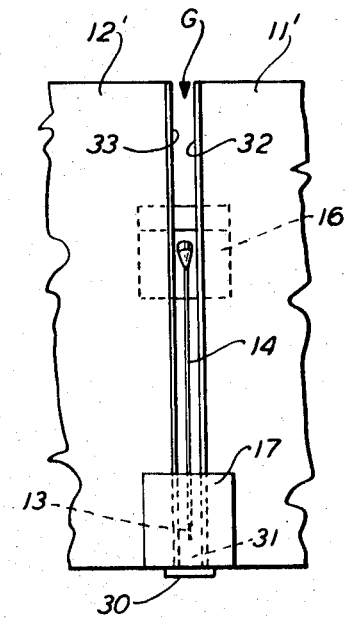
FIG. 3
FIG. 4
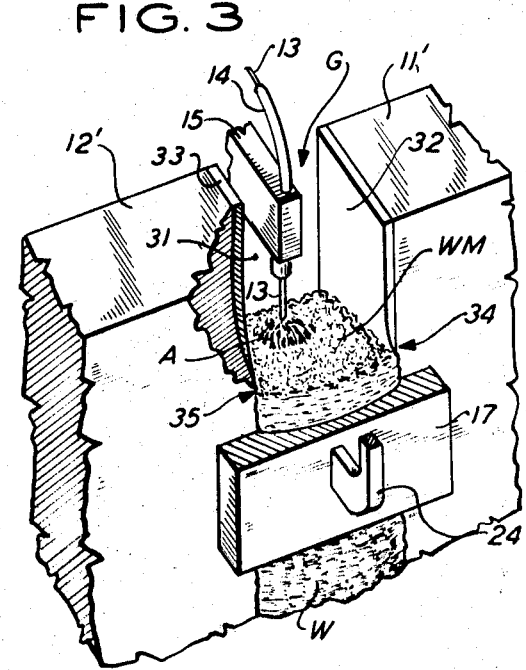
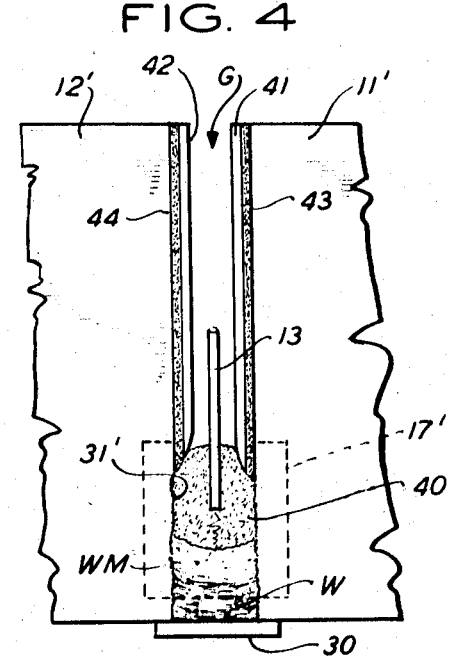
INVENTOR
CRAIG R. SIBLEY
BY Larry R. Lassett
ATTORNEY

VERTICAL ELECTRIC WELDING WITH HEAT ABSORBING WORK LINING

This invention relates to a method of and apparatus for electrically butt-welding comparatively thick metal plates, and in particular, to vertical electric welding wherein the plates are positioned generally in a vertical plane in spaced edgewise relation to form a uniformly narrow, vertical welding gap. The invention is equally applicable to the so-called "electroslag" welding method wherein the welding electrode is progressively melted within a bath of molten slag, and to the "electrogas" method wherein the electrode is melted by an arc immediately above the molten weld metal within a protective gas shield. The invention can also be applied to vertical submerged arc-welding wherein an arc is established between the welding electrode and weld metal within a protective layer of flux.

In prior practice, vertical welding has been done in various ways, a common example comprising feeding a welding wire, either individually or through a consumable nozzle or like, into a retaining receptacle or cavity, usually formed by adjustable plate-bridging dams at opposite sides of the gap. As the welding dams are raised according to the rate of deposit of weld metal in the receptacle, the weld is gradually built up, starting from the foot of the gap. This welding technique, while effective for vertically welding large work pieces requiring long, continuous welds, such as used for ship building, has introduced heating problems by reason of the welding heat (concentrated in a partially enclosed and restricted region) seriously affecting quality of the completed weldment. That is, there is a tendency toward massive, high rate, deep heat penetration of the work pieces, resulting in overheating that, combined with slow cooling, produces coarse grain structure in the "heat affected zone" (HAZ) adjoining the weld. This in turn, tends to decrease the quality of the weldment.

Various methods directed to more rapid cooling and smaller grain size by limiting, absorbing or conducting away excess heat, such as reduction of input welding energy, heat conducting and insulated nozzles for the welding wire, liquid cooling of the welding dams, etc., have been tried but with limited practical success in preventing deep, high temperature penetration of the work. The problem, moreover, is aggravated by the large size and location of the work that, for practical reasons, precludes the use of ordinary annealing methods for restoring fine grain size and weld strength of overheated weldments.

A principal object of the present invention, therefore, is to provide an improved technique for vertical welding wherein massive, deep penetration of welding heat into the work is effectively precluded by controlled heat absorption without impairing the welding function.

A related object is to provide a combined welding and heat absorption technique for limiting in predictable manner the amount and rate of penetration of welding heat into the opposing work faces for preventing overheating, thereby maintaining comparatively small grain size in the work with correspondingly high strength and soundness of the weldment.

A more specific object is to provide each of the opposing work faces with consumable heat sink material suitable for fusion with both the work and weld metal, for absorbing welding gap heat approximately in excess of that required for making a uniformly strong and sound weld.

In accordance with the invention as applied in specific application thereof to "electroslag" and "electroslag" vertical welding equipment, the work surface facing the welding gap at each side is lined with a metal strip, the thickness of which is empirically related to the width of the welding gap and to the input welding energy, for initially absorbing at a high rate generally in the manner of a heat sink, heat energy tending to enter the work, and subsequently melting and fusing with the work and the molten weld metal for making an integrated strong weld.

Other objects, features and advantages will appear from the following description with reference to the accompanying drawings, in which:

FIG. 1 is a partial elevational view of vertical welding equipment of the electrogas type shown by way of example, for practicing the present invention;

FIG. 2 is an elevational front view of the workpieces and essential welding elements shown in FIG. 1, initially positioned and processed for practicing the invention;

FIG. 3 is an enlarged partial view in perspective and partly broken away, of the electrogas vertical welding equipment illustrating practice of the invention; and FIG. 4 is a partial front view in elevation of electroslag vertical welding equipment illustrating practice of the invention.

Referring first to FIG. 1, one mode of practicing the invention is represented by a commercial form of vertical welding equipment 10 of the electrogas type, shown here only in part. The equipment is fully shown and described in U.S. Pat. No. 3,235,705, granted to Agnew et al., 15 Feb. 1966 for "Vertical welding," and a brief discussion of its more significant features will be sufficient for present purposes.

The work is shown as consisting of two large, generally rectangular metal plates 11 and 12 of material such as mild or low alloy steel for example, aligned edgewise, side by side along a vertical plane ans spaced at the adjoining vertical edges to form a narrow, vertical welding gap. Weld metal is deposited in the gap, starting at the foot, by a consumable welding electrode 13 consisting of weld wire of suitable composition. The wire is fed through a guide tub 14 to a welding head 15 extending laterally into the gap, by a feed drive mechanism 16 that determines the rate of weld metal deposition. An electric arc is established in well-known manner between the electrode at 13 and the work for progressively melting the wire and filling the gap with weld metal. In normal operation, the electrode is centered in the gap by the weld head 15 so that the arc axis is in a generally vertical position between the molten weld metal and electrode.

The molten weld metal is retained in the gap as the weld is built up, by welding dams 17 and 18 that yieldingly engage in bridging relation that plates 11 and 12 at opposite sides of the gap, thereby defining a cavity or receptacle that is open at the top for receiving the electrode. As the welding gap is filled, the dams, together with the weld head, are gradually raised in unison by means of common mounting structure. As shown, this may comprise an overhead, vertically adjustable beam 19 that carries in depending relation through linkage partly indicated at 20, a supporting table 21. A slide 22 having a bracket 23 that supports both the weld head is and wire feed drive 16, is guided on the table for adjustment in direction normal to the work. The dam 17 at the outside is supported directly from beam 19 by a positioning link 24; the other dam 18 is positioned by a pneumatic device 25 that is in turn; mounted beneath the table 21. The dam 18 has also mounted at its upper side, a gas chamber 26 supplied by conduit 27 from a suitable source of arc-shielding gas. This chamber is normally positioned by the dam centrally of the gap and somewhat above the arc level so that its outlet nozzle at 28 directs the shielding gas generally downward completely to envelop the arc and weld metal.

The entire welding assembly described above is vertically movable with respect to the work by motive means (not shown) connected to the main support beam 19 for automatically positioning the assembly during the welding operation, and for resetting the assembly for another operation.

In FIG. 2 and 3, pertinent parts of the welding assembly are indicated in relation to the prepared workpieces 11' and 12' for practicing the invention. FIG. 2 represents the initial position for vertical welding wherein the dams are located across the foot of the welding gap G. A "Starting" baseplate 30 bridges the lower edges of the workpieces to form with the dams and work, a retaining cavity 31 for the initially deposited weld from the electrode wire 13.

Each work piece, 11' and 12', is initially prepared according to the invention by securing to its welding edge as by tack-welding or other suitable means, a consumable metal strip, 32 and 33 preferably of composition similar to the work, or at least compatible therewith. Each strip corresponds approximately in length and width to similar dimensions of the respective work edge to constitute a facing or covering therefor. The thickness of the strip is empirically related to the width of the welding gap G and to the input energy of the welding arc for causing the strip material properly to fuse with the work and weld in a manner presently to be described. In certain cases, as where the electroslag method is used, the backing face of the strip in contact with the work preferably has in whole or in part, a flux coating for insuring proper fusion with the work. In general, this flux coating or lining has been found unnecessary for the electrogas method herein disclosed.

The present vertical welding technique is shown in more detail by FIG. 3 which represents an electrogas welding operation as having progressed to a point where the solid weld W is nearly complete. The welding electrode at 13 and the dams, but one of which, 17, is indicated for clarity of disclosure, are now near the upper part of the work gap G, and the welding arc A is represented as depositing molten weld metal WM within the cavity formed by the dams. As explained above, the gas chamber nozzle 28, FIG. 1, carried by the rear dam 18 (not shown in FIG. 3) directs the shielding gas downward into the cavity 31, FIG. 2, for enveloping the arc and molten weld metal as disclosed in more detail in U.S. Pat. No. 3,235,705, above.

Referring again to FIG. 3, the welding arc heat which is highly concentrated within the cavity, continues to melt the electrode material while keeping molten the newly formed puddle of weld metal WM in the cavity. At the same time, the adjacent portions of the work-facing strips at opposite sides of the gap directly exposed to the arc heat, gradually melt and fuse with both the work and weld metal, as generally indicated at 34 and 35, generally 3. During this process, the strips absorb in the manner of a heat sink, a material amount of highly concentrated welding heat that would otherwise deeply penetrate the work at a comparatively high rate, thereby raising the interior temperature of the work an excessive amount and impairing the quality of the weldment. Thus, there is achieved according to the invention an improved weld by precluding large-grain incident to overheating the interior of the work.

As mentioned above, the thickness of the heat-absorbing strip is selected according to certain variable factors and characteristics of the welding gap and heat energy input. That is, for a given weld if the strip is too thin, it will melt prematurely without absorbing sufficient heat, thus resulting in excessive heat penetration into the work; if the strip is too thick, it will absorb too much heat during melting, with the result that the strip material is not properly fused with the work.

In practice of the invention, excellent results have been obtained in sample welding using available electroslag welding equipment of the character shown in FIG. 4. For test purposes, the electroslag equipment was of simple construction and manually controlled, so that a brief description of the essential elements thereof and of the process will be sufficient for illustrating practice of the invention. In FIG. 4, the work pieces 11' and 12' were lined at opposite sides of the gap G with metal strips, 41 and 42 respectively, the strips in this instance being flux coated at 43 and 44 on the sides adjoining the work. Adjustable welding dams, one of which is indicated at 17', define with the work the retaining cavity 31'. The cavity initially is charged with the proper amount of flux, and the welding wire 13 is fed into the cavity beneath the flux for contacting the starting base plate 30. As the welding current is established, the weld wire terminal melts to form molten weld metal, the attendant heat in turn melting the flux to form a slag pool 40 above the molten weld metal WM. The molten slag is sufficiently conductive to form in effect a resistance conductor between the electrode and weld metal for generating the welding heat. As the weld is built up in the gap according to rate of feed of the weld wire, the slag pool (charged manually as required), rises accordingly for maintaining a constant relationship between the electrode terminal and weld metal in accordance with known practice.

It will be understood that FIG. 3 and 4 are intended primarily for showing application of the invention to the electrogas and electroslag welding methods, and are not to be taken as representing actual dimensional relations between solid and fused portions at the work edges in the region of the welding arc.

Several sample welds were made according to the invention under different conditions as described below, on low alloy, 1-1/4-inch steel plate, using flux-backed steel strip as described above in welding gaps 15/16 and 1-1/8 inches wide as measured between strips. The strip composition was in general similar to that of the work and the flux-backing consisted of a coating of standard flux applied as a slurry of approximately 1/16-inch thickness. The flux-back strips were attached by tack-welding directly to the work. Conventional low alloy steel welding wire suitable for the work was used, and electrical welding data were approximately 600 amperes and 41 volts. A backing coating of flux, while not essential in all applications of metal strip, may be useful in some cases for improved fusion and for introducing limited heat lag between the strip and work according to the amount and insulating character of the flux.

It is also within the scope of the invention to use consumable heat sinks consisting of a suitable heat absorbing material other than metal at the gap faced of the work. For example, a flux having a high melting point may be applied as a coating directly to the work faces or as strips wherein the flux is combined with a suitable binder. The heat-absorbing capacity of the coating (or strip) should be such that massive heat penetration into the work is substantially precluded during the transition period when the affected portion of the heat sink is exposed to maximum welding heat, i.e., when it is opposite the contiguous arc or heat source. Heat sinks of this character are especially applicable to electroslag and submerged-arc vertical welding techniques.

Physical properties such as hardness and grain size, of the metal in the heat-affected zone, that is, the portion of the base metal or work at either side of the weld metal extending from the fusion line into the work for a discernible distance, are as is well know, useful criteria for judging quality of the weldment. Although the metal in this zone has not been melted, its mechanical properties or microstructures have been altered by the welding heat.

Comparative hardness data obtained by standard tests on two vertical weld samples made with heat sinks according to the invention, and one sample made according to prior practice, are listed in table I below. For insuring comparative evaluation, all three test welds were made under similar conditions by the electroslag welding equipment described above, on work of essentially the same composition.

TABLE I

| Test Sample weld | Work (in.) | Welding gap width (in.) | Heat sink | Hardness values Weld metal | Heat affected zone(s) |
|---|---|---|---|---|---|
| No. 1 | 1¼ M.S. plate | 15/16 | None | Rb 82 | Rb 72 |
| No. 2 | do | 1⅛ | 1/16" M.S. strip with flux backing, on work at one side of gap. and 7/32" M.S. strip with flux backing, on work at opposite side of gap. | Rb 85 | Rb 88 |
| No. 3 | do | 15/16 | 1/16" M.S. strip with flux backing, on work at both sides of gap. | Rb 85 | Rb 89 Rb 88 |

A comparison of hardness HAZ values taken on the conventional weld sample No. 1 where the invention is not used, and on the invention weld, sample No. 3 for instance, shows for the invention a very significant hardness increase, namely about 22 percent. The central weld metal itself in No. 1 is not materially affected, as would normally be expected. It is also seen that the difference in strip thickness in sample No. 2 allows considerable tolerance insofar as hardness is concerned. The hardness tests followed standard procedure wherein a series of tests were made at spaced points along a straight line between definite points. For a given heat-affected zone, the line extended from the fusion or weld line into the work a prescribed distance. The resulting HAZ test readings were then averaged, which gives a reliable basis for comparing the hardness of the respective zones under examination.

Optical and visual inspection of the cross sections of the actual weldments, samples Nos. 2 and 3, showed that there was good fusion of the heat-absorbing strips and the work at both sides of the gap in each weld, and that the grain growth in each weld was on the whole, a great deal less than in the prior art sample, No. 1. Also, in samples Nos. 2 and 3 the heat-affected zones all appear by inspection to have generally uniform and moderate depth of heat penetration along lines more closely parallel with the respective sides of the gap than in sample No. 1. The fusion or weld lines tend to conform with desired configuration, i.e., nearly straight across the work.

In another series of tests, a conventional sample weld and two sample welds of the invention were more closely examined for determining HAZ grain size and growth. In making the sample welds of the invention, the thickness of the strips in each test sample differed a small amount (below and above, respectively) from the mean value (0.141 inches) of the strip thicknesses (1/16 inch and 7/32 inches) listed in table I. Reference is made to table II below for considering the test results.

In each sample weld of Table 11, the work consisted of 1-1/4-inches mild steel (M.S.) plate, the welding gap width was approximately 1 inch and the welding conditions corresponded to those of Table I.

TABLE II

| Test Sample Weld | Heat Sink | ASTM Grain Size in HAZ (12 mm.) | | |
|---|---|---|---|---|
| | | 1–4 mm. | 4–8 mm. | 8–12 mm. |
| No. 4 | None | 1–3½ | 2–4 | 3–5 |
| No. 5 | 0.132 in.M.S. strip on work at each side of gap | 1–5½ | 5½–7 | 5½–7½ |
| No. 6 | 0.176 in.M.S. strip on work at each side of gap | 2–5½ | 6–7 | 7–7½ |

The HAZ length examined for each sample weld was 12 mm., as measured from the fusion line toward the work at one side of the weld. The respective fusion lines at opposite sides of the gap were for practical purposes, symmetrically located with respect to the gap. For noting grain size, standard practice was followed wherein the HAZ sample surfaces were processed for 100 × magnification photography by conventional metallographic technique and the estimated grain size number noted from the photographs according to ASTM standards, wherein No. 1 represents large grains resulting from slow cooling, with progressive decrease of grain size with corresponding increase in the ASTM number.

For comparative evaluation of grain size in corresponding heat affected zones, samples 4–6, the range of estimated grain size in each 4 mm. section of a respective zone was noted.

From this tabulation, it is apparent that the HAZ grain growth in the conventional weld, sample 4, was materially greater throughout, than in the invention welds of samples 5 and 6 respectively. In other words, the smaller HAZ grain size in the invention welds is tangible evidence of less heat penetration and less overheating of the work.

It will also be noted that the somewhat greater heat-absorbing capacity of the 0.176-inch strip, sample 6, resulted in a discernible decrease in HAZ grain size, as compared with the thinner 0.132-inch strip, sample 5.

Summarizing the data of Table II, the smaller grain sizes generally throughout the heat-affected zones of the welds of the invention, samples 5 and 6, indicate an apparent shift in high peak temperatures in the work toward the fusion line, as compared with the conventional sample weld, sample 4, and therefore less heat penetration.

The preferred range of strip thickness for the welding conditions described may be considered for practical purposes as being from approximately 1/16 to 7/32 inches where the strips are composed of mild steel. As stated above, strip thickness is empirically determined due to the variables of the welding gap, etc., however, practice of the invention indicates that strip thickness is not a precisely critical value and that liberal tolerance is sometimes permissible.

The invention described above, accordingly constitutes a distinctive and significant advance in the vertical welding art by providing in a predictable manner uniformly improved weldments; furthermore, the present comparatively simple and inexpensive technique herein disclosed can be practiced in most cases by means of unmodified existing welding equipment.

Having set forth the invention in what is considered to be the best embodiment thereof, it will be understood that changes may be made in method and apparatus as above set forth without departing from the spirit of the invention or exceeding the scope thereof as defined in the following claims.

I Claim:

1. In a generally vertical welding method whereby two metal workpieces are joined along their essentially square abutting edges in a single pass by use of an electric arc between a consumable electrode and a weld pool in the gap formed between said abutting edges and welding dams on each side thereof and wherein the heat of the arc melts portions of each of said workpieces which molten metal flows into said gap and subsequently solidifies forming a weld between said workpieces, the improvement comprising, substantially covering each of said abutting edges prior to forming the weld therebetween with a separate consumable strip of material compatible with the composition of the workpieces, each strip being secured to a respective edge at spaced points and absorbing a portion of the heat generated during the welding method in completely melting each of said strips thereby reducing the amount of heat which would otherwise be dissipated in the workpieces.

2. A vertical welding method as specified in claim 1 wherein the heat-absorbing material is in the form of an elongated strip for facing each of said abutting edges respectively.

3. A vertical welding method as specified in claim 2 wherein the strips are attached to the workpieces and are composed of a metal compatible in composition with that of the workpieces for fusion with the workpieces and the weld metal.

4. A vertical welding method as specified in claim 3 wherein the metal strips each have a coating of flux on the side adjoining the workpieces.

5. A vertical welding method as specified in claim 3 wherein the width of the welding gap is approximately 1 inch and the thickness of the metal strips is within an approximate range of 1/16 to 7/32 inches, with heat absorbing capability for precluding massive penetration of welding heat into the workpieces during application of the welding heat.

UNITED STATES PATENT OFFICE
CERTIFICATE OF CORRECTION

Patent No. U.S. 3,602,688        Dated November 8, 1971

Inventor(s) Craig R. Sibley

It is certified that error appears in the above-identified patent and that said Letters Patent are hereby corrected as shown below:

Column 1, line 19, after "or" (2nd instance) insert --the--
Column 1, line 64, "electroslag" (2nd instance) should be --electrogas"--
Column 2, line 17, the word "welding" should be capitalized
Column 2, line 22, "ans" should be --and--
Column 2, line 26, "tub" should be --tube--
Column 2, line 37 "that" should be --the--
Column 2, line 46, "is" should be --15--
Column 2, line 49, after "from" insert --the--
Column 2, line 67, "Starting" should be --"starting"--
Column 2, line 70, after the word "weld" insert the word --metal--
Column 3, line 6, after the word "weld" insert the word --metal--
Column 3, line 32, delete "generally" and insert therefore --Figure--
Column 3, line 33, after "of" (second instance) insert --the--
Column 3, line 40, after "large-grain" insert --growth--
Column 4, line 26, "flux-back" should be --fluxed-back--
Column 4, line 36, "faced" should read -- faces --.
Column 5, line 37, "11" should be --II--

Signed and sealed this 11th day of April 1972.

(SEAL)
Attest:

EDWARD M. FLETCHER, JR.
Attesting Officer

ROBERT GOTTSCHALK
Commissioner of Patents